(12) United States Patent
Huang et al.

(10) Patent No.: US 11,422,146 B2
(45) Date of Patent: Aug. 23, 2022

(54) WIND SPEED MEASUREMENT USING DISTRIBUTED FIBER OPTIC SENSING

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/221,805

(22) Filed: Apr. 4, 2021

(65) Prior Publication Data

US 2021/0311088 A1 Oct. 7, 2021

Related U.S. Application Data

(60) Provisional application No. 63/005,487, filed on Apr. 6, 2020.

(51) Int. Cl.
*G01P 5/00* (2006.01)
(52) U.S. Cl.
CPC ..................... *G01P 5/00* (2013.01)
(58) Field of Classification Search
CPC ..................... G01P 5/00; G01P 5/26
See application file for complete search history.

(56) References Cited

U.S. PATENT DOCUMENTS

| | | | |
|---|---|---|---|
| 9,995,628 B1* | 6/2018 | Han | G01K 11/3206 |
| 2020/0005036 A1* | 1/2020 | Ji | G06V 10/30 |
| 2020/0319017 A1* | 10/2020 | Tian | G02B 6/483 |

FOREIGN PATENT DOCUMENTS

| | | | |
|---|---|---|---|
| CN | 203465288 U | * | 3/2014 |
| JP | 2009162657 A | * | 7/2009 |

OTHER PUBLICATIONS

Karl Lapo, Distributed observation of wind direction using microstructures attached to actively heated fiber optic cables, Nov. 25, 2019, Atmospheric Techniques, http//doi.org/10.519/amt-13-1563-2020, pp. 1563-1573 (Year: 2020).*
Huang, Chuan-Ying, "A Fiber Bragg Grating Based Anemometer", Jul. 10, 2018, Sensors: www.mdpi.com/journal/sensors, pp. 1-8 (Year: 2018).*
Zhang, A. Ping, "Advances in Optical Fiber Bragg Grating Sensor Technologies", Photonic Sensors (2012) vol. 2, No. 1: 1-13 (Year: 2012).*

\* cited by examiner

*Primary Examiner* — Francis C Gray
(74) *Attorney, Agent, or Firm* — Joseph Kolodka

(57) ABSTRACT

Aspects of the present disclosure describe distributed fiber optic sensing (DFOS) systems, methods, and structures that advantageously measure wind speed at utility poles that support fiber optic cables and—in many applications—electrical and/or other communications cables (i.e., cable television).

8 Claims, 2 Drawing Sheets

WIND SPEED MEASUREMENT USING DISTRIBUTED FIBER OPTIC SENSING

CROSS REFERENCE

This disclosure claims the benefit of U.S. Provisional Patent Application Ser. No. 63/005,487 filed 6 Apr. 2020 the entire contents of which is incorporated by reference as if set forth at length herein.

TECHNICAL FIELD

This disclosure relates generally to distributed fiber optic sensing (DFOS) applications directed to wind speed measurement.

BACKGROUND

As is known, countless numbers of utility poles support fiber optic cable for communications and conventional electrical cables for electricity distribution. As will be appreciated by those skilled in the art, such overhead cables oftentimes require maintenance due to weather related conditions and in particular wind events that can damage the cables. Oftentimes, wind speed is observed and measured using point measurement techniques that may not directly be indicative of threatening conditions to the cables.

SUMMARY

An advance in the art is made according to aspects of the present disclosure directed to distributed fiber optic sensing systems (DFOS), methods, and structures that are advantageously measure wind speed at utility poles that support fiber optic cables and—in many applications—electrical and/or other communications cables (i.e., cable television).

According to aspects of the present disclosure, a DFOS is used in conjunction with fiber "pinwheels" to detect/estimate wind speed and the pole. The fiber pinwheels translate wind energy to vibrational energy that is detected by the DFOS. With appropriate calibration, an accurate measurement of wind speed may be made at points along a length of fiber optic cable.

Of particular advantage, fiber pinwheels according to aspects of the present disclosure may be passive devices which may be mounted on utility poles providing an accurate measurement of wind speed at the location of the utility pole—without generally requiring any auxiliary electrical power. Such pinwheels—coupled with DFOS systems—micro-location wind speed as experienced by cables on the utility poles and advantageously permit real-time monitoring and minimization of downed cables resulting from wind events.

BRIEF DESCRIPTION OF THE DRAWING

A more complete understanding of the present disclosure may be realized by reference to the accompanying drawing in which.

DESCRIPTION

Figure 1:
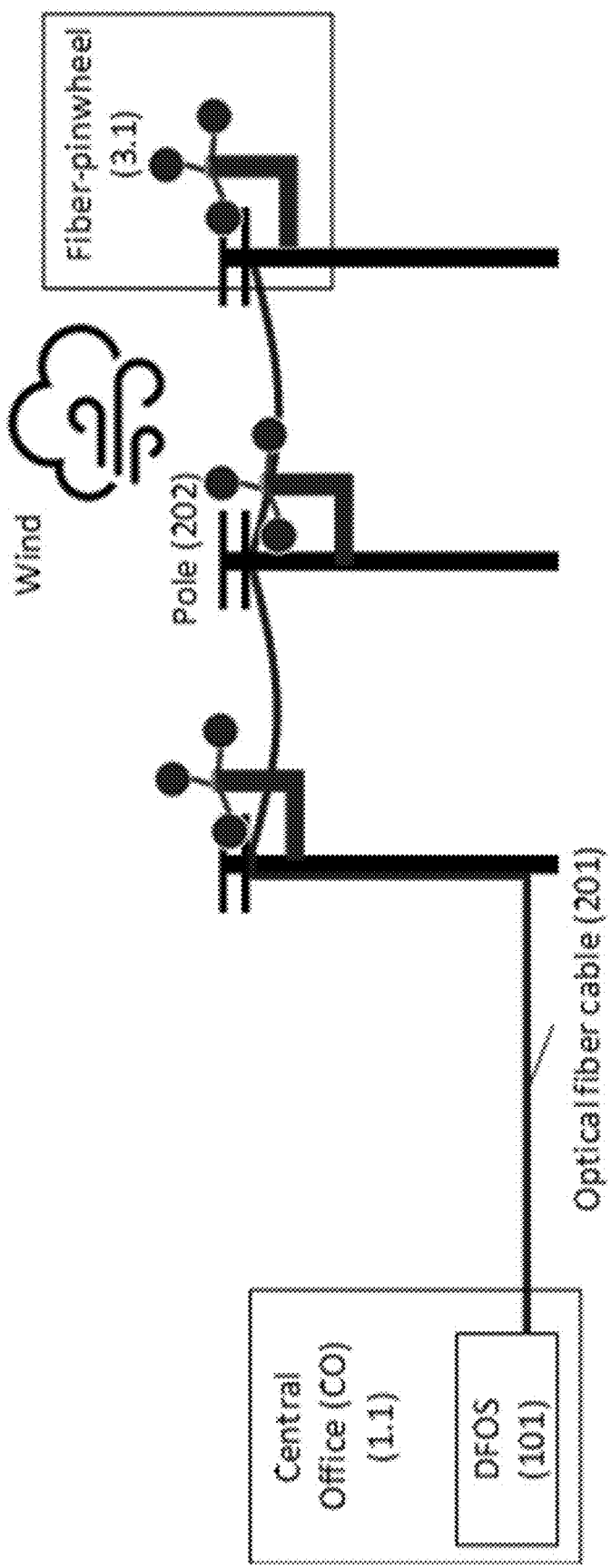
FIG. 1 is a schematic diagram showing an illustrative wind speed measurement using distributed fiber optic sensing (DFOS) technologies with fiber pinwheel(s) according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

FIG. 1 is a schematic diagram showing an illustrative wind speed measurement using distributed fiber optic sensing (DFOS) technologies with fiber pinwheel(s) according to aspects of the present disclosure. Turning now to that figure, it may be observed that the DFOS system (101) is shown located in a central office (CO—1.1). Such centralized location of a DFOS allows a single DFOS to control/remotely monitor numerous segments of fiber optic cable and any sensors included as part of such segments. As shown further in this figure, the sensing technologies—DFOS—employed in this application according to aspects of the present disclosure may advantageously include a distributed vibration sensing (DFS) or a distributed acoustic sensing (DAS) technology which are connected to and/or mechanically and/or acoustically coupled to the optical fiber sensing cable (201) that is shown as field deployed.

Generally, field deployment of fiber optic cable such as that shown may be suspended/supported as overhead aerial cables on utility poles (202). Shown further are fiber pinwheels (3.1), attached to the utility pole(s) such that when there is sufficient wind, the pinwheel spins and imparts mechanical vibrations to the pole/fiber optic cable and subsequently detected by the DFOS.

While not specifically shown, those skilled in the art will understand and appreciate that the fiber-pinwheel according to an aspect of the present disclosure is similar to a conventional anemometer—a device used for measuring wind speed and direction that is commonly part of a weather station. Similarly, a fiber-pinwheel may include a number of substantially hemispherical cups—generally three—mounted on horizontal arms which in turn are mounted on a vertical shaft. When air flows past the cups, the shaft turns at a rate that is roughly proportional to the wind speed. According to aspects of the present disclosure, the rotational motion of the shaft/cups is translated to a mechanical vibration—which in turn is detected by the DFOS.

Those skilled in the art will appreciate that alternative arrangements are possible and contemplated for such fiber pinwheels. More particularly, a vane style, or propeller style of fiber-pinwheel are contemplated for the present disclosure as well. All that is required is that the device reacts to wind and produces mechanical vibrations in the fiber optic cable wherein the vibrations are indicative of the wind speed experienced by the pinwheel device.

Accordingly, an aspect of the present disclosure is the conversion of air movement (wind) into vibration and/or frequency signals that may be detected by the DFOS system via the fiber optics cable.

Figure 2:
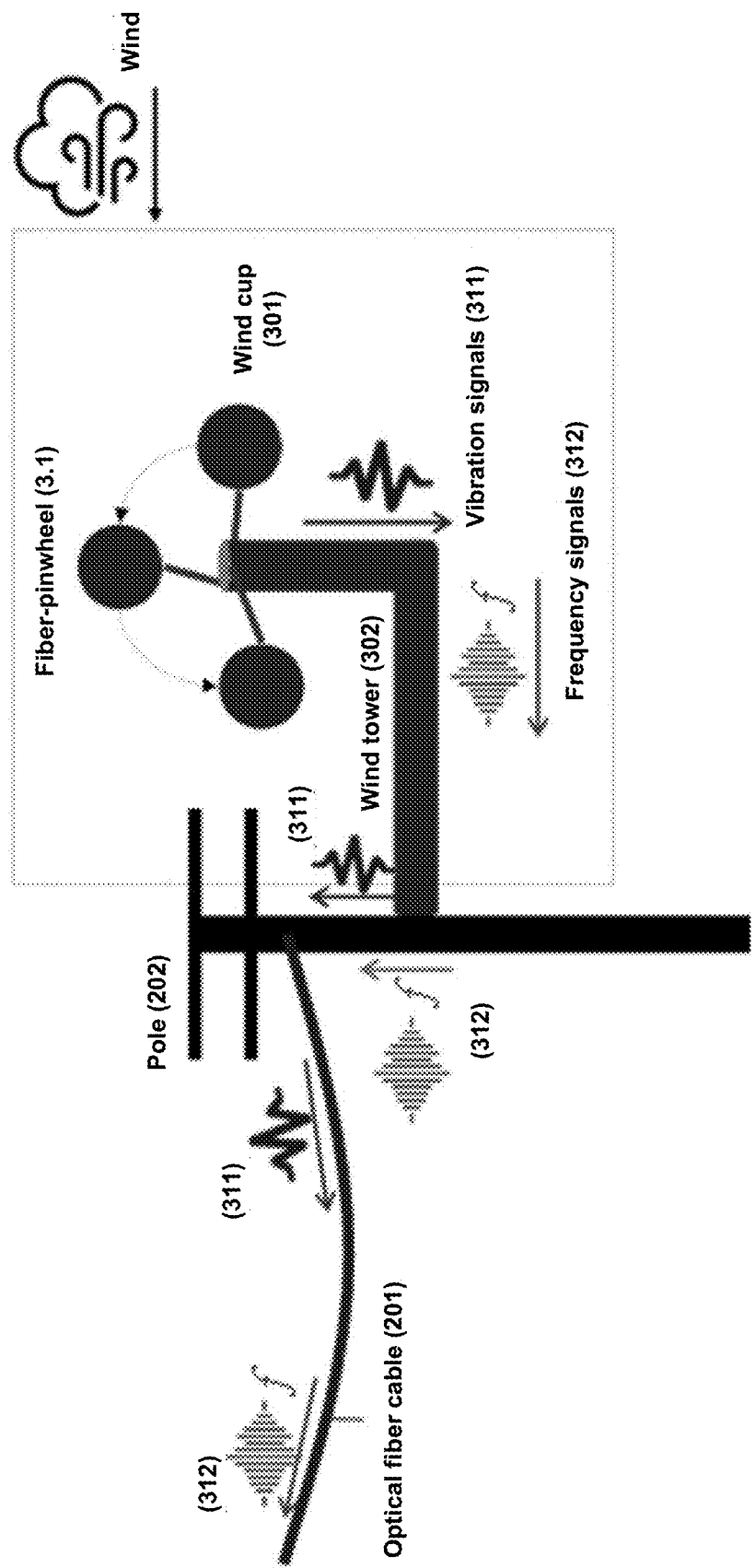
FIG. 2 is a schematic diagram showing an illustrative detail of fiber pinwheel wind speed measurement using DFOS technologies according to aspects of the present disclosure.

FIG. 2 is a schematic diagram showing an illustrative detail of fiber pinwheel wind speed measurement using DFOS technologies according to aspects of the present disclosure. As noted above and as may be observed in the figure, the illustrative fiber pinwheel may include a number of wind cups (301) and wind tower (302) which mounts to the utility pole. When the wind is blowing, the wind cups move and initiate vibration signals (3.1) which in turn are translated into the fiber optic cable.

In order to enhance any vibration/signal coupling into the fiber optic cable, the wind tower may be a one-piece confirmation or another structure that efficiently transfers mechanical vibration. We note further that mechanical ratcheting or offset cam type vibratory mechanisms may be employed in the pinwheel to enhance the generation of vibrations.

We note that vibration signals (311) and frequency components (312) generated by fiber pinwheel in response to wind will affect DFOS interrogation signals and be conveyed back to central office by the fiber optic cable and detected by the DFOS system. Advantageously, artificial intelligence (AI) models and training based on stationary weather stations allow the system to learn pattern characteristics, and therefore windspeed at a particular pinwheel location may be determined and/or estimated.

In a particular illustrative embodiment, the faster the wind speed at a pinwheel, the higher any frequency components and larger vibration signals may be generated. Conversely, slower wind speed will generate signals exhibiting substantially opposite characteristics, namely lower frequency and lower vibration signals. Those skilled in the art will readily appreciate and understand that our illustrative fiber pinwheels described may advantageously operate without electrical power—or alternatively may locally generate such power during operation. As such, distribution throughout/along an entire fiber optic span/facility/route is possible thereby providing real time monitoring of environmental/wind conditions along the length of such facility. More particularly, such pinwheels may be mounted on every utility pole supporting the optical fiber thereby providing a "micro" wind speed location determining that heretofore was not provided in the art.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system for wind speed measurement, said system comprising:
   a length optical fiber cable, at least a portion of the length being suspended by one or more utility pole(s);
   a DFOS interrogator system in optical communication with the optical fiber cable;
   one or more fiber pinwheels attached to the utility poles, said fiber pinwheels generating mechanical vibrations in response to moving air (wind), said mechanical vibrations imparted to the fiber cable; and
   an intelligent analyzer configured to analyze DFOS sensing data received by the DFOS interrogator system, said analyzer configured to determine wind speed at one of the fiber pinwheels.

2. The DFOS system of claim 1 wherein the intelligent analyzer is configured to determine wind speed at a plurality of the fiber pinwheels.

3. The DFOS system of claim 2 wherein individual ones of the fiber pinwheels are connected to an individual one of the utility poles by a wind tower that communicates mechanical vibrations generated by the individual one of the fiber pinwheels to the individual one of the utility poles.

4. The DFOS system of claim 1 wherein the fiber pinwheels generate vibration and frequency signals in response to the wind.

5. The DFOS system of claim 1 that is configured using artificial intelligence models and databases of historic calibration data to determine wind speed.

6. The DFOS system of claim 5 wherein a fast wind speed is associated with high intensity and high frequency vibrations.

7. The DFOS system of claim 6 wherein a slow wind speed is associated with low intensity and low frequency vibrations.

8. The DFOS system of claim 7 wherein the DFOS system employs distributed vibration sensing (DVS) or distributed acoustic sensing (DAS).

\* \* \* \* \*